(12) United States Patent
McMasters et al.

(10) Patent No.: US 8,171,734 B2
(45) Date of Patent: May 8, 2012

(54) SWIRLERS

(75) Inventors: Marie Ann McMasters, Mason, OH (US); Michael A. Benjamin, Cincinnati, OH (US); Alfred Mancini, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 876 days.

(21) Appl. No.: 12/200,956

(22) Filed: Aug. 29, 2008

(65) Prior Publication Data
US 2009/0255265 A1    Oct. 15, 2009

Related U.S. Application Data

(60) Provisional application No. 61/044,116, filed on Apr. 11, 2008.

(51) Int. Cl.
F02C 1/00    (2006.01)

(52) U.S. Cl. .......................................................... 60/748

(58) Field of Classification Search .................... 60/737, 60/740, 742, 746–749, 761–766; 239/398
See application file for complete search history.

(56) References Cited

U.S. PATENT DOCUMENTS

| | | | |
|---|---|---|---|
| 1,908,066 | A | 5/1933 | Sedlmeir |
| 3,291,191 | A | 12/1966 | Stoops |
| 3,480,416 | A | 11/1969 | Stoops et al. |
| 3,684,186 | A | 8/1972 | Helmrich |
| 4,216,652 | A | 8/1980 | Herman et al. |
| 5,460,758 | A | 10/1995 | Langer et al. |
| 5,794,601 | A | 8/1998 | Pantone |
| 5,824,250 | A | 10/1998 | Whalen et al. |
| 5,916,142 | A | 6/1999 | Snyder et al. |
| 5,988,531 | A | 11/1999 | Maden et al. |
| 6,256,995 | B1 | 7/2001 | Sampath et al. |
| 6,269,540 | B1 | 8/2001 | Islam et al. |
| 6,321,541 | B1 | 11/2001 | Wrubel et al. |
| 6,355,086 | B2 | 3/2002 | Brown et al. |
| 6,363,726 | B1 | 4/2002 | Durbin et al. |
| 6,367,262 | B1 | 4/2002 | Mongia et al. |
| 6,381,964 | B1 | 5/2002 | Pritchard, Jr. et al. |
| 6,389,815 | B1 | 5/2002 | Hura et al. |
| 6,391,251 | B1 | 5/2002 | Keicher et al. |

(Continued)

FOREIGN PATENT DOCUMENTS

EP    0042454    6/1980

(Continued)

OTHER PUBLICATIONS

U.S. Appl. No. 11/365,428, filed Mar. 1, 2006.

(Continued)

*Primary Examiner* — Louis Casaregola
*Assistant Examiner* — Phutthiwat Wongwian
(74) *Attorney, Agent, or Firm* — General Electric Company; David Clement

(57) ABSTRACT

A unitary swirler is disclosed, comprising a body having a swirler axis, and a plurality of vanes arranged in a circumferential direction around the swirler axis, wherein the swirler has a unitary construction. In one embodiment, the unitary swirler has a rim located coaxially with the swirler axis, and a wall extending between a portion of the rim and a portion of the hub. In another embodiment, the unitary swirler has an adaptor having a passage that is configured to direct a flow of air towards at least some of the plurality of vanes.

28 Claims, 13 Drawing Sheets

U.S. PATENT DOCUMENTS

| | | | |
|---|---|---|---|
| 6,419,446 B1 * | 7/2002 | Kvasnak et al. | 415/191 |
| 6,442,940 B1 | 9/2002 | Young et al. | |
| 6,460,340 B1 | 10/2002 | Chauvette et al. | |
| 6,523,350 B1 | 2/2003 | Mancini et al. | |
| 6,672,066 B2 | 1/2004 | Wrubel et al. | |
| 6,676,892 B2 | 1/2004 | Das et al. | |
| 6,705,383 B2 | 3/2004 | Beeck et al. | |
| 6,711,898 B2 | 3/2004 | Laing et al. | |
| 6,715,292 B1 | 4/2004 | Hoke | |
| 6,718,770 B2 | 4/2004 | Laing et al. | |
| 6,755,024 B1 | 6/2004 | Mao et al. | |
| 6,811,744 B2 | 11/2004 | Keicher et al. | |
| 6,834,505 B2 | 12/2004 | Al-Roub et al. | |
| 6,839,607 B2 | 1/2005 | Wooten | |
| 6,865,889 B2 | 3/2005 | Mancini et al. | |
| 6,976,363 B2 | 12/2005 | McMasters et al. | |
| 6,993,916 B2 * | 2/2006 | Johnson et al. | 60/776 |
| 7,056,095 B1 | 6/2006 | Gigas et al. | |
| 7,062,920 B2 | 6/2006 | McMasters et al. | |
| 7,104,066 B2 | 9/2006 | Leen et al. | |
| 7,121,095 B2 | 10/2006 | McMasters et al. | |
| 7,506,510 B2 | 3/2009 | Thomson | |
| 7,779,636 B2 | 8/2010 | Buelow et al. | |
| 2003/0121266 A1 * | 7/2003 | Modi et al. | 60/740 |
| 2007/0017224 A1 | 1/2007 | Li et al. | |
| 2007/0028595 A1 | 2/2007 | Mongia et al. | |
| 2007/0028617 A1 | 2/2007 | Hsieh et al. | |
| 2007/0028618 A1 * | 2/2007 | Hsiao et al. | 60/737 |
| 2007/0028620 A1 | 2/2007 | McMasters et al. | |
| 2007/0028624 A1 | 2/2007 | Hsieh et al. | |
| 2007/0071902 A1 | 3/2007 | Dietrich et al. | |
| 2007/0084047 A1 | 4/2007 | Lange et al. | |
| 2007/0098929 A1 | 5/2007 | Dietrich et al. | |
| 2007/0119177 A1 * | 5/2007 | McMasters et al. | 60/737 |
| 2007/0163114 A1 | 7/2007 | Johnson | |

FOREIGN PATENT DOCUMENTS

| | | |
|---|---|---|
| EP | 0019421 | 11/1980 |
| EP | 2009257 | 12/2008 |
| GB | 837500 | 6/1960 |

OTHER PUBLICATIONS

PCT Search Report issued for corresponding application No. PCT/US2009/037101, mailed Mar. 13, 2012.

PCT Search Report issued for corresponding application No. PCT/US2009/037224, mailed Feb. 7, 2012.

PCT Search Report issued for corresponding application No. PCT/US2009/039085, mailed Feb. 6, 2012.

PCT Search Report issued for corresponding application No. PCT/US2009/039100, mailed Feb. 6, 2012.

* cited by examiner

SWIRLERS

CROSS-REFERENCE TO RELATED APPLICATIONS

This Application claims priority to U.S. Provisional Application Ser. No. 61/044,116, filed Apr. 11, 2008, which is herein incorporated by reference in its entirety.

BACKGROUND OF THE INVENTION

This invention relates generally to swirlers, and more specifically to unitary swirlers for promoting mixing of fuel and air in fuel nozzles used in gas turbine engines.

Turbine engines typically include a plurality of fuel nozzles for supplying fuel to the combustor in the engine. The fuel is introduced at the front end of a burner in a highly atomized spray from a fuel nozzle. Compressed air flows around the fuel nozzle and mixes with the fuel to form a fuel-air mixture, which is ignited by the burner. Because of limited fuel pressure availability and a wide range of required fuel flow, many fuel injectors include pilot and main nozzles, with only the pilot nozzles being used during start-up, and both nozzles being used during higher power operation. The flow to the main nozzles is reduced or stopped during start-up and lower power operation. Such injectors can be more efficient and cleaner-burning than single nozzle fuel injectors, as the fuel flow can be more accurately controlled and the fuel spray more accurately directed for the particular combustor requirement. The pilot and main nozzles can be contained within the same nozzle assembly or can be supported in separate nozzle assemblies. These dual nozzle fuel injectors can also be constructed to allow further control of the fuel for dual combustors, providing even greater fuel efficiency and reduction of harmful emissions. The temperature of the ignited fuel-air mixture can reach an excess of 3500° F. (1920° C.). It is therefore important that the fuel supply conduits, flow passages and distribution systems are substantially leak free and are protected from the flames and heat.

Various governmental regulatory bodies have established emission limits for acceptable levels of unburned hydrocarbons (HC), carbon monoxide (CO), and oxides of nitrogen (NOx), which have been identified as the primary contributors to the generation of undesirable atmospheric conditions. Therefore, different combustor designs have been developed to meet those criteria. For example, one way in which the problem of minimizing the emission of undesirable gas turbine engine combustion products has been attacked is the provision of staged combustion. In that arrangement, a combustor is provided in which a first stage burner is utilized for low speed and low power conditions to more closely control the character of the combustion products. A combination of first stage and second stage burners is provided for higher power outlet conditions while attempting to maintain the combustion products within the emissions limits. It will be appreciated that balancing the operation of the first and second stage burners to allow efficient thermal operation of the engine, while simultaneously minimizing the production of undesirable combustion products, is difficult to achieve. In that regard, operating at low combustion temperatures to lower the emissions of NOx, can also result in incomplete or partially incomplete combustion, which can lead to the production of excessive amounts of HC and CO, in addition to producing lower power output and lower thermal efficiency. High combustion temperature, on the other hand, although improving thermal efficiency and lowering the amount of HC and CO, often results in a higher output of NOx. In the art, one of the ways in which production of undesirable combustion product components in gas turbine engine combustors is minimized over the engine operating regime is by using a staged combustion system using primary and secondary fuel injection ports.

Another way that has been proposed to minimize the production of those undesirable combustion product components is to provide for more effective intermixing of the injected fuel and the combustion air. In that regard, numerous swirler and mixer designs have been proposed over the years to improve the mixing of the fuel and air. In this way, burning occurs uniformly over the entire mixture and reduces the level of HC and CO that result from incomplete combustion. However, there is still a need to minimize the production of undesirable combustion products over a wide range of engine operation conditions. Better mixing of fuel and air in fuel nozzles using swirlers designed to promote such mixing will be useful in reducing undesirable combustion emissions.

Over time, continued exposure to high temperatures during turbine engine operations may induce thermal stresses in the conduits and fuel nozzles which may damage the conduits or fuel nozzle and may adversely affect their operation. For example, thermal stresses may cause fuel flow reductions in the conduits and may lead to excessive fuel maldistribution within the turbine engine. Exposure of fuel flowing through the conduits and orifices in a fuel nozzle to high temperatures may lead to coking of the fuel and lead to blockages and non-uniform flow. To provide low emissions, modern fuel nozzles require numerous, complicated internal air and fuel circuits to create multiple, separate flame zones. Fuel circuits may require heat shields from the internal air to prevent coking, and certain tip areas may have to be cooled and shielded from combustion gases. Furthermore, over time, continued operation with damaged fuel nozzles may result in decreased turbine efficiency, turbine component distress, and/or reduced engine exhaust gas temperature margin.

Improving the life cycle of fuel nozzles installed within the turbine engine may extend the longevity of the turbine engine. Known fuel nozzles include a delivery system, a mixing system, and a support system. The delivery system comprising conduits for transporting fluids delivers fuel to the turbine engine and is supported, and is shielded within the turbine engine, by the support system. More specifically, known support systems surround the delivery system, and as such are subjected to higher temperatures and have higher operating temperatures than delivery systems which are cooled by fluid flowing through the fuel nozzle. It may be possible to reduce the thermal stresses in the conduits and fuel nozzles by configuring their external and internal contours and thicknesses.

Air-fuel mixers have swirler assemblies that swirl the air passing through them to promote mixing of air with fuel prior to combustion. The swirler assemblies used in the combustors may be complex structures having axial, radial or conical swirlers or a combination of them. In the past, conventional manufacturing methods have been used to fabricate mixers having swirler components that are assembled or joined together using known methods to form the swirler assemblies. For example, in some mixers with complex vanes, individual vanes are first machined and then brazed into an assembly. Investment casting methods have been used in the past in producing some combustor swirlers. Other swirlers have been machined from raw stock. Electro-discharge machining (EDM) has been used as a means of machining the vanes in conventional swirlers.

Conventional gas turbine engine components such as, for example, fuel nozzles and their associated swirlers, conduits and distribution systems, are generally expensive to fabricate and/or repair because the conventional fuel nozzle designs having complex swirlers, conduits and distribution circuits for transporting, distributing and mixing fuel with air include a complex assembly and joining of more than thirty components. More specifically, the use of braze joints can increase the time needed to fabricate such components and can also complicate the fabrication process for any of several reasons, including: the need for an adequate region to allow for braze alloy placement; the need for minimizing unwanted braze alloy flow; the need for an acceptable inspection technique to verify braze quality; and, the necessity of having several braze alloys available in order to prevent the re-melting of previous braze joints. Moreover, numerous braze joints may result in several braze runs, which may weaken the parent material of the component. The presence of numerous braze joints can undesirably increase the weight and manufacturing cost of the component.

Accordingly, it would be desirable to have swirlers having complex geometries for mixing liquid fuel and air in fuel nozzles that have a unitary construction for reducing undesirable effects from thermal exposure described earlier. It is desirable to have swirlers having complex geometries with a unitary construction to reduce the cost and for ease of assembly as well as providing protection from adverse thermal environment. It is desirable to have a method of manufacturing to provide a unitary construction for unitary swirlers having complex three-dimensional geometries for transporting air, such as, for example, swirler systems in fuel nozzles.

BRIEF DESCRIPTION OF THE INVENTION

The above-mentioned need or needs may be met by exemplary embodiments which provide a unitary swirler comprising a body having a swirler axis, and a plurality of vanes arranged in a circumferential direction around the swirler axis, wherein the swirler has a unitary construction.

In another embodiment, a unitary swirler has a rim located coaxially with the swirler axis, and a wall extending between a portion of the rim and a portion of the hub.

In another embodiment, a unitary swirler has an adaptor having a passage that is configured to direct a flow of air towards at least some of the plurality of vanes.

In another embodiment, a unitary swirler has at least one vane having a geometry that is different from another vane.

In another embodiment, a unitary swirler has a body having an insulation gap located at least partially within the body.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
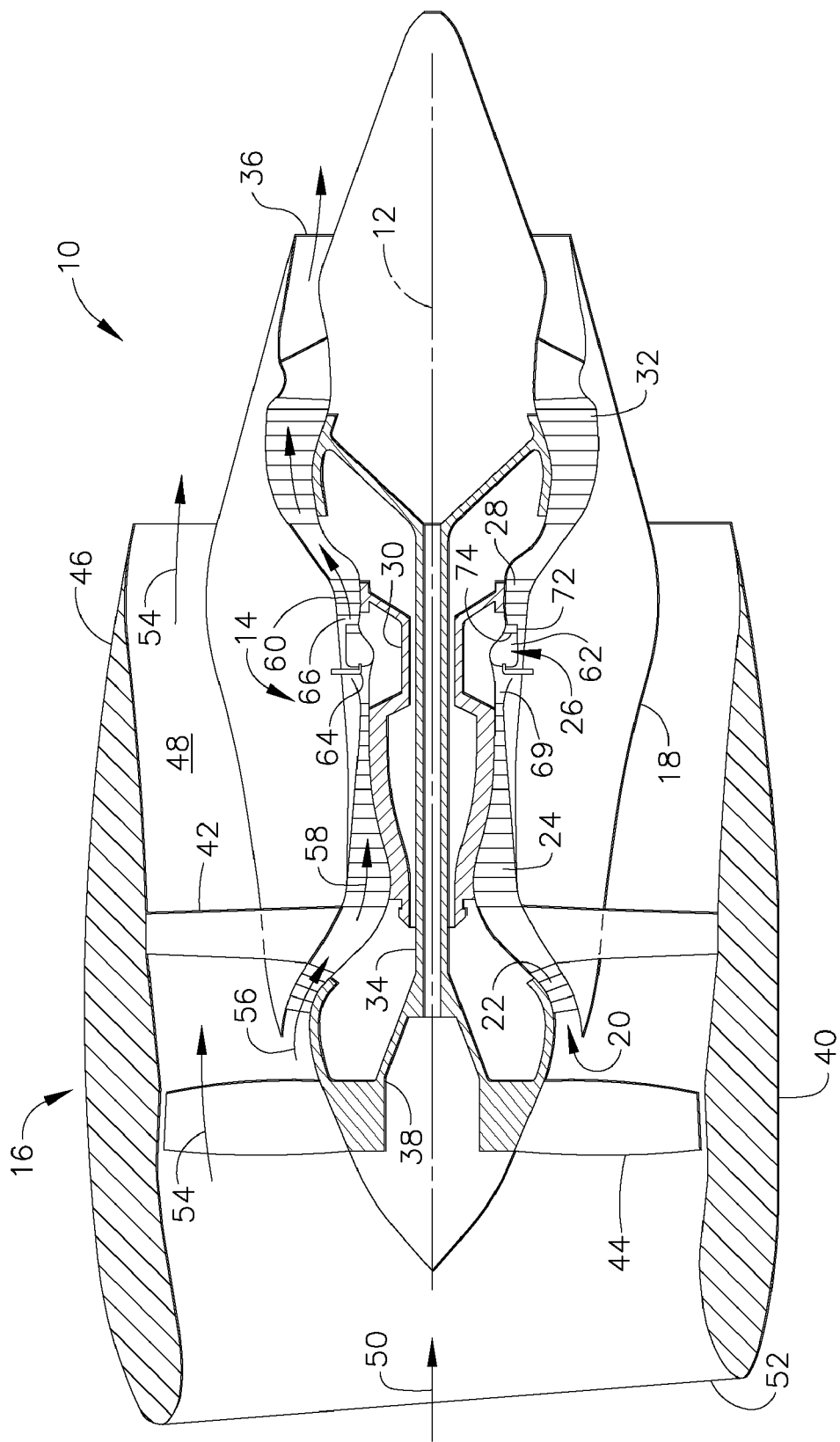
FIG. 1 is a diagrammatic view of a high bypass turbofan gas turbine engine comprising an exemplary fuel nozzle having a swirler according to an exemplary embodiment of the present invention.

Referring now to the drawings in detail, wherein identical numerals indicate the same elements throughout the figures, FIG. 1 shows in diagrammatic form an exemplary gas turbine engine 10 (high bypass type) incorporating an exemplary fuel nozzle 100 having an exemplary embodiment of a swirler (such as items 200, 300, 400 shown in the figures and described herein) used for promoting mixing of air with the fuel in the fuel nozzle 100. The exemplary gas turbine engine 10 has an axial centerline axis 12 therethrough for reference purposes. Engine 10 preferably includes a core gas turbine engine generally identified by numeral 14 and a fan section 16 positioned upstream thereof. Core engine 14 typically includes a generally tubular outer casing 18 that defines an annular inlet 20. Outer casing 18 further encloses and supports a booster 22 for raising the pressure of the air that enters core engine 14 to a first pressure level. A high pressure, multi-stage, axial-flow compressor 24 receives pressurized air from booster 22 and further increases the pressure of the air. The pressurized air flows to a combustor 26, where fuel is injected into the pressurized air stream and ignited to raise the temperature and energy level of the pressurized air. The high energy combustion products flow from combustor 26 to a first (high pressure) turbine 28 for driving the high pressure compressor 24 through a first (high pressure) drive shaft 30, and then to a second (low pressure) turbine 32 for driving booster 22 and fan section 16 through a second (low pressure) drive shaft 34 that is coaxial with first drive shaft 30. After driving each of turbines 28 and 32, the combustion products leave core engine 14 through an exhaust nozzle 36 to provide at least a portion of the jet propulsive thrust of the engine 10.

Fan section 16 includes a rotatable, axial-flow fan rotor 38 that is surrounded by an annular fan casing 40. It will be appreciated that fan casing 40 is supported from core engine 14 by a plurality of substantially radially-extending, circumferentially-spaced outlet guide vanes 42. In this way, fan casing 40 encloses fan rotor 38 and fan rotor blades 44. Downstream section 46 of fan casing 40 extends over an outer portion of core engine 14 to define a secondary, or bypass, airflow conduit 48 that provides additional jet propulsive thrust.

From a flow standpoint, it will be appreciated that an initial airflow, represented by arrow 50, enters gas turbine engine 10 through an inlet 52 to fan casing 40. Air flow 50 passes through fan blades 44 and splits into a first compressed air flow (represented by arrow 54) that moves through conduit 48 and a second compressed air flow (represented by arrow 56) which enters booster 22.

The pressure of second compressed air flow 56 is increased and enters high pressure compressor 24, as represented by arrow 58. After mixing with fuel and being combusted in combustor 26, combustion products 60 exit combustor 26 and flow through first turbine 28. Combustion products 60 then flow through second turbine 32 and exit exhaust nozzle 36 to provide at least a portion of the thrust for gas turbine engine 10.

The combustor 26 includes an annular combustion chamber 62 that is coaxial with longitudinal axis 12, as well as an inlet 64 and an outlet 66. As noted above, combustor 26 receives an annular stream of pressurized air from a high pressure compressor discharge outlet 69. A portion of this compressor discharge air ("CDP" air), identified by the numeral 190 in the figures herein, flows into a mixer (not shown). Fuel is injected from a fuel nozzle tip assembly to mix with the air and form a fuel-air mixture that is provided to combustion chamber 62 for combustion. Ignition of the fuel-air mixture is accomplished by a suitable igniter, and the resulting combustion gases 60 flow in an axial direction toward and into an annular, first stage turbine nozzle 72. Nozzle 72 is defined by an annular flow channel that includes a plurality of radially-extending, circumferentially-spaced nozzle vanes 74 that turn the gases so that they flow angularly and impinge upon the first stage turbine blades of first turbine 28. As shown in FIG. 1, first turbine 28 preferably rotates high pressure compressor 24 via first drive shaft 30. Low pressure turbine 32 preferably drives booster 24 and fan rotor 38 via second drive shaft 34.

Combustion chamber 62 is housed within engine outer casing 18. Fuel is supplied into the combustion chamber by fuel nozzles 100, such as for example shown in FIGS. 2 and 3. Liquid fuel is transported through conduits within a stem 103, such as, for example, shown in FIG. 3, to the fuel nozzle tip assembly 68. Conduits that have a unitary construction may be used for transporting the liquid fuel into the fuel nozzle tip assembly 68 of the fuel nozzles 100. The fuel supply conduits, may be located within the stem 103 and coupled to a fuel distributor tip 180. Pilot fuel and main fuel are sprayed into the combustor 26 by fuel nozzle tip assemblies 68, such as for example, shown in FIGS. 2 and 3. During operation of the turbine engine, initially, pilot fuel is supplied through a pilot fuel flow passage, such as, for example, shown as items 102, 104 in FIG. 3, during pre-determined engine operation conditions, such as during startup and idle operations. The pilot fuel is discharged from fuel distributor tip 180 through the pilot fuel outlet 162. When additional power is demanded, main fuel is supplied through main fuel passageways 105 (see FIG. 3) and the main fuel is sprayed using the main fuel outlets 165.

Figure 2:
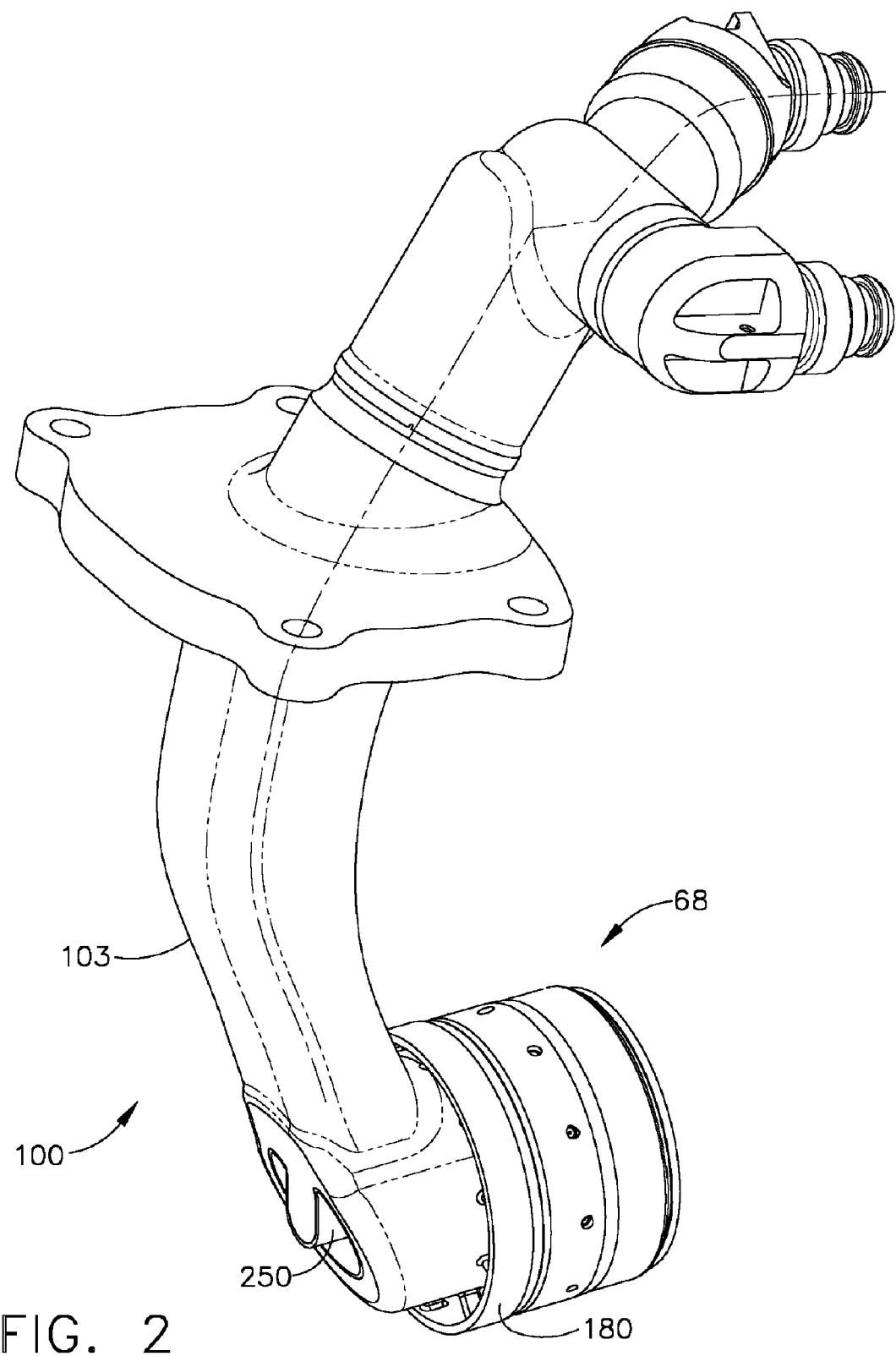
FIG. 2 is an isometric view of an exemplary fuel nozzle having a swirler according to an exemplary embodiment of the present invention.
Figure 3:
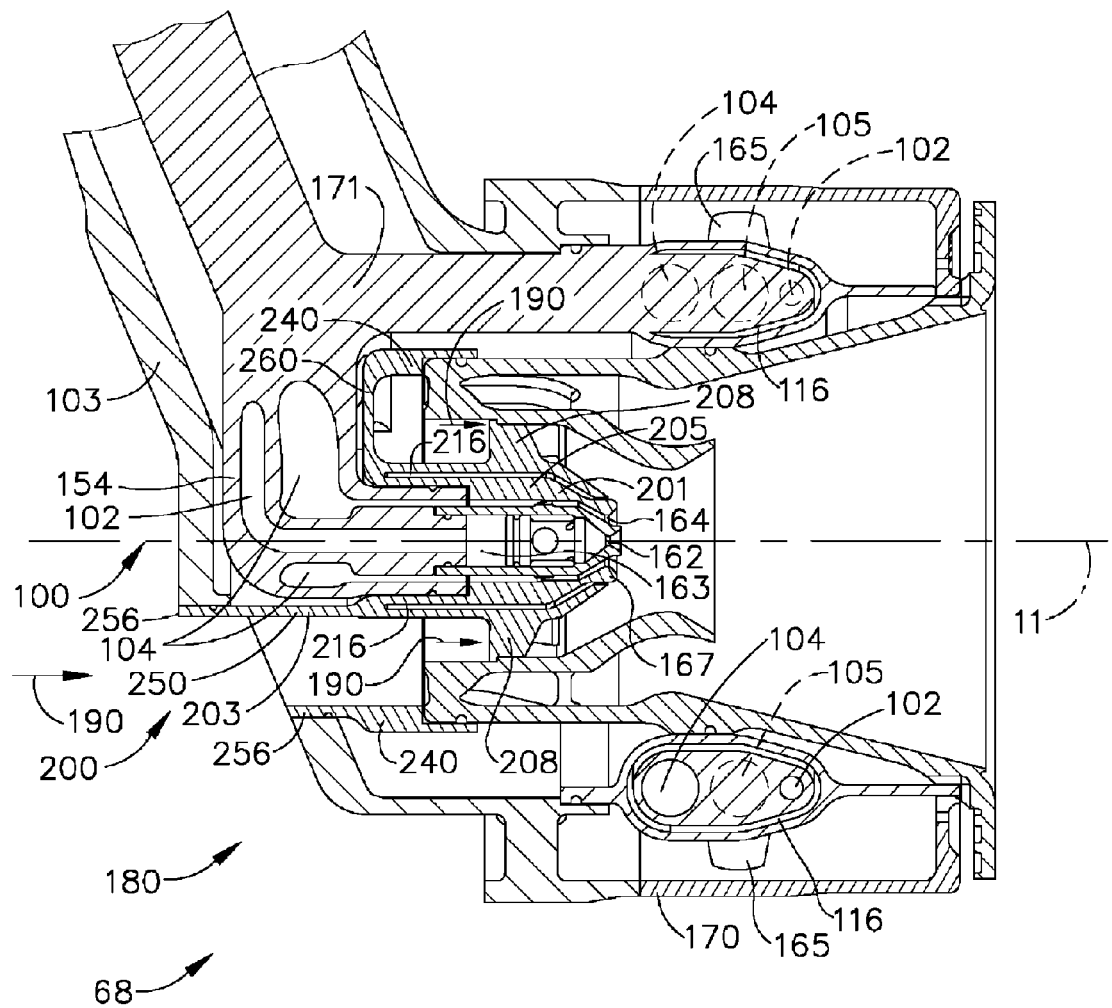
FIG. 3 is an axial cross-sectional view of an exemplary nozzle tip assembly of the exemplary fuel nozzle shown in FIG. 2.
Figure 4:
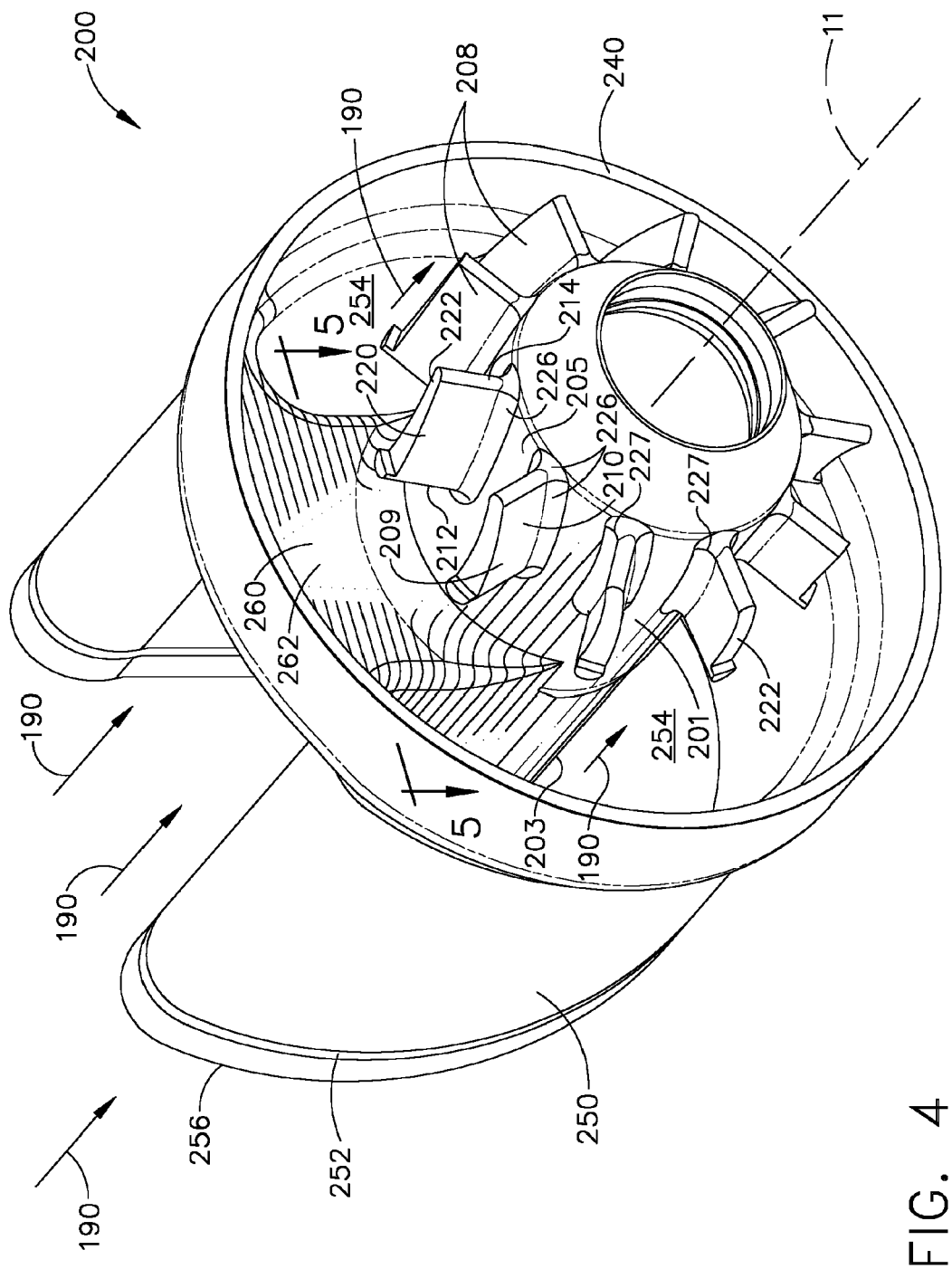
FIG. 4 is an isometric view of a swirler according to an exemplary embodiment of the present invention.
Figure 5:
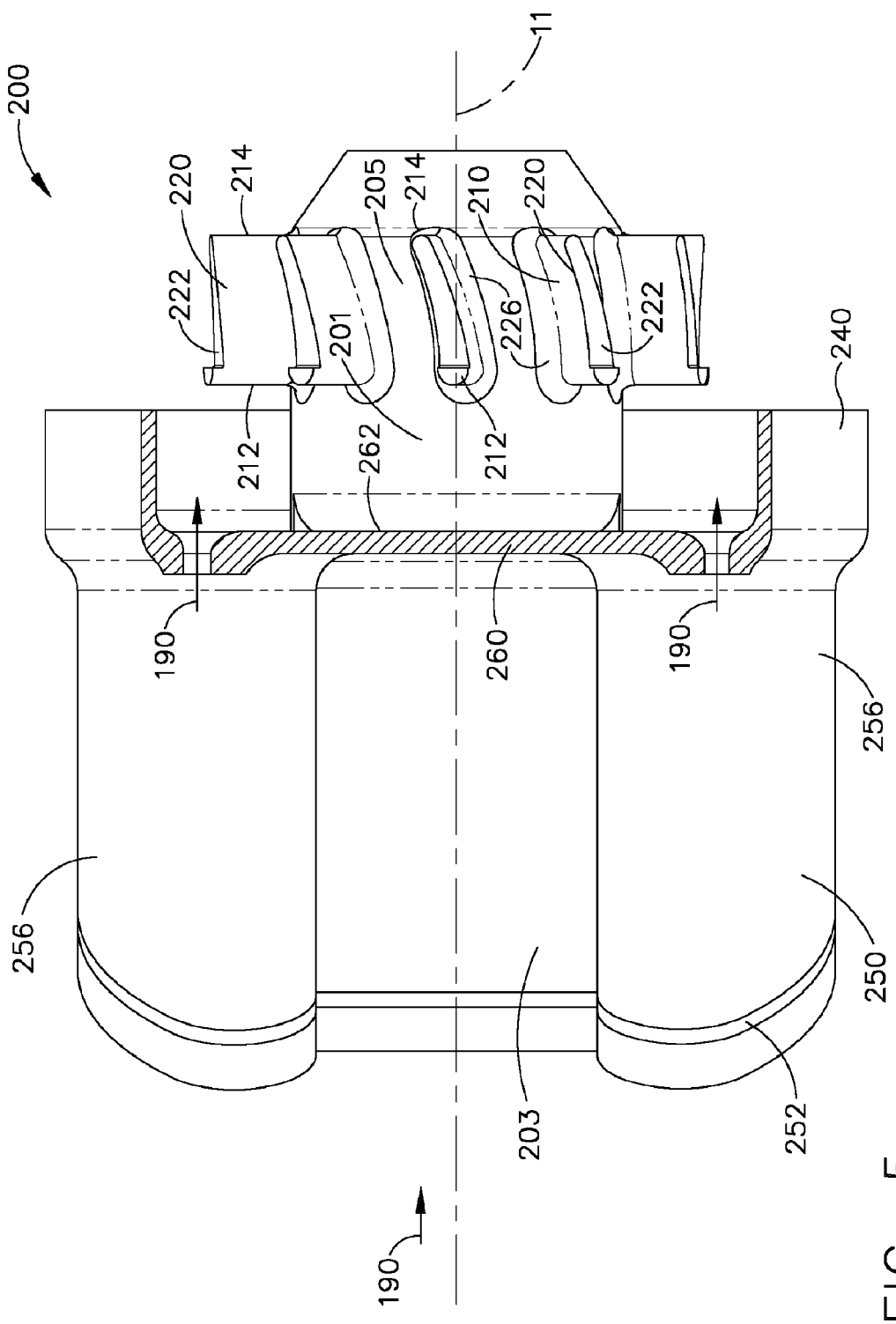
FIG. 5 is a top plan view of the exemplary swirler shown in FIG. 4 with a portion sectioned away.
Figure 6:
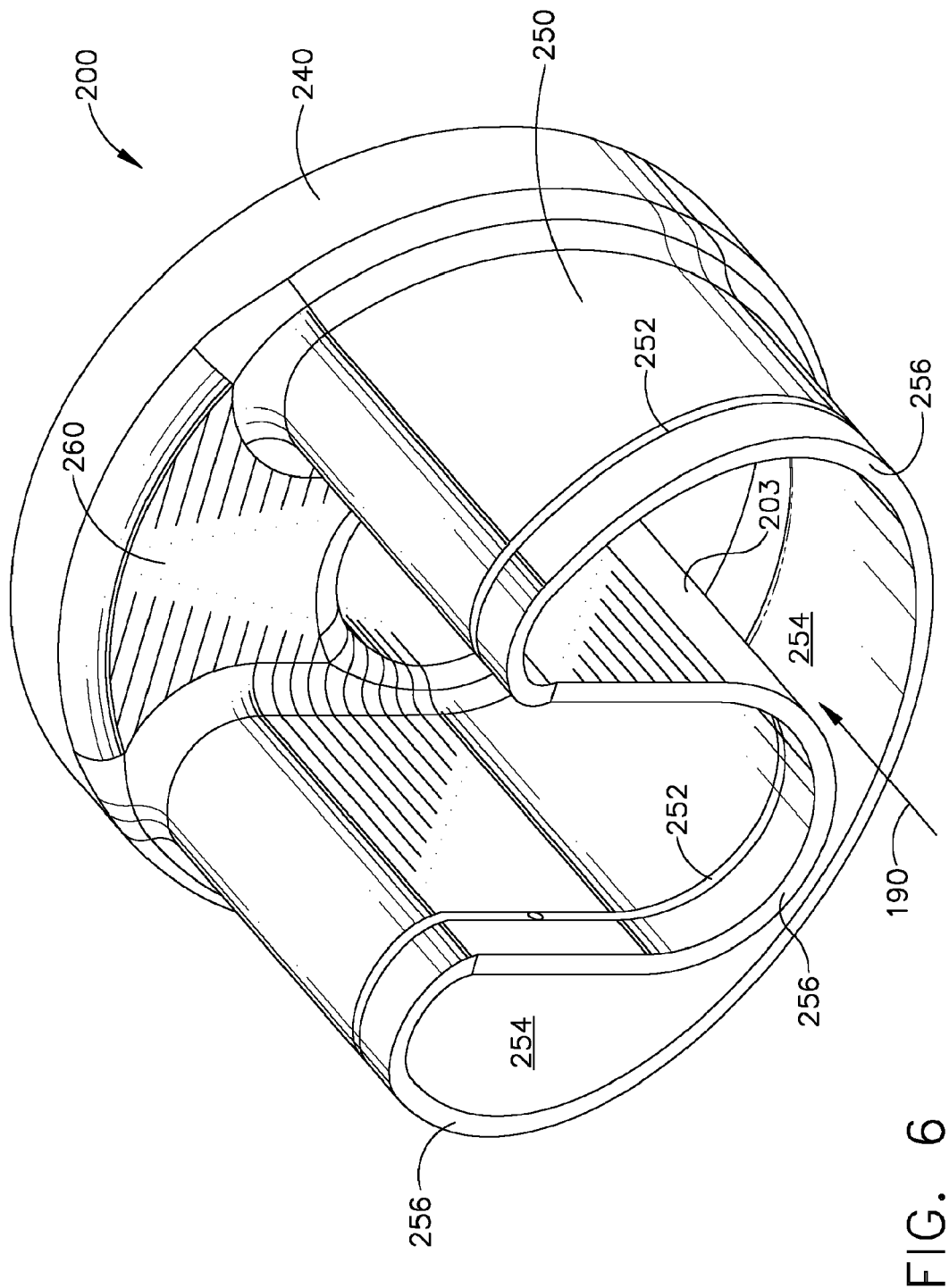
FIG. 6 is another isometric view of the exemplary swirler shown in FIG. 4.

FIGS. 4-6 show an exemplary embodiment of the present invention of a unitary swirler 200. FIGS. 2 and 3 show an exemplary embodiment of a fuel nozzle 100 and fuel nozzle tip 68 having the exemplary unitary swirler 200. FIGS. 7-10 show alternative exemplary embodiments of unitary swirlers 300, 400. The term "unitary" is used in this application to denote that the associated component, such as the swirlers 200, 300, 400 described herein, is made as a single piece during manufacturing. Thus, a unitary component has a monolithic construction for the component. FIG. 4 shows an isometric view of a unitary swirler 200 according to an exemplary embodiment of the present invention. The exemplary swirler 200 shown in FIG. 4 includes a circumferential array of vanes 208 that impart a swirling motion to the air passing therethrough. The exemplary swirler 200 shown in FIG. 4 may have a unitary construction made using methods described subsequently herein.

Referring to FIGS. 2 and 3, fuel distributor tip 180 extends from the stem 103 such that main fuel passageways 105 and the pilot fuel passageways 102, 104 in the unitary distributor ring 171 are coupled in flow communication corresponding fuel supply conduits contained within the stem 103. Main fuel passageways 105 are coupled in flow communication to main fuel circuits defined within unitary distributor ring 171. Primary pilot passage 102 and secondary pilot passage 104 are coupled in flow communication with corresponding pilot injectors positioned radially inward within a fuel nozzle (see FIG. 3). It will be apparent to those skilled in the art that although the distributor ring 171 has been described herein above as a unitary conduit (i.e., having a unitary construction), it is possible to use a distributor ring 171 having other suitable manufacturing constructs using methods known in the art. The unitary distributor ring 171 is attached to the stem 103 using conventional attachment means such as brazing. Alternatively, the unitary distributor ring 171 and the stem 103 may be made by rapid manufacturing methods such as for example, direct laser metal sintering, described herein.

FIG. 3 shows an axial cross section of an exemplary fuel nozzle tip 68 having an exemplary embodiment of the present invention of a unitary swirler 200. The exemplary fuel nozzle tip 68 shown in FIG. 3 has two pilot fuel flow passages, referred to herein as a primary pilot flow passage 102 and a secondary pilot flow passage 104. Referring to FIG. 3, the fuel from the primary pilot flow passage 102 exits the fuel nozzle through a primary pilot fuel injector 163 and the fuel from the secondary pilot flow passage 104 exits the fuel nozzle through a secondary pilot fuel injector 167. The primary pilot flow passage 102 in the distributor ring 171 is in flow communication with a corresponding pilot primary passage in the supply conduit contained within the stem 103 (see FIG. 2). Similarly, the secondary pilot flow passage 104 in the distributor ring 171 is in flow communication with a corresponding pilot secondary passage in the supply conduit contained within the stem 103.

As described previously, fuel nozzles, such as those used in gas turbine engines, are subject to high temperatures. Such exposure to high temperatures may, in some cases, result in fuel coking and blockage in the fuel passages, such as for example, the exit passage 164. One way to mitigate the fuel coking and/or blockage in the distributor ring 171 is by using heat shields to protect the passages (such as items 102, 104, 105 shown in FIG. 3) from the adverse thermal environment. In the exemplary embodiment shown in FIG. 3, the fuel conduits 102, 104, 105 are protected by gaps 116 and heat shields that at least partially surround these conduits. The gap 116 provides protection to the fuel passages by providing insulation from adverse thermal environment. In the exemplary embodiment shown, the insulation gaps 116 have widths between about 0.015 inches and 0.025 inches. The heat shields can be made from any suitable material with ability to withstand high temperature, such as, for example, cobalt based alloys and nickel based alloys commonly used in gas turbine engines. In exemplary embodiment shown in FIG. 3, the distributor ring 171 has a unitary construction wherein the distributor ring 171, the flow passages 102, 104, 105, the fuel outlets 165, the heat shields and the gaps 116 are formed such that they have a monolithic construction.

FIG. 4 shows an isometric view of a swirler 200 according to an exemplary embodiment of the present invention. The exemplary swirler 200 comprises a body 201 having a hub 205 that extends circumferentially around a swirler axis 11. A row of vanes 208 extending from the hub 205 are arranged in a circumferential direction on the hub 205, around the swirler axis 11. Each vane 208 has a root portion 210 located radially near the hub 205 and a tip portion 220 that is located radially outward from the hub 205. Each vane 208 has a leading edge 212 and a trailing edge 214 that extend between the root portion 210 and the tip portion 220. The vanes 208 have a suitable shape, such as, for example, an airfoil shape, between the leading edge 212 and the trailing edge 214. Adjacent vanes form a flow passage for passing air, such as the CDP air shown as item 190 in FIG. 4, that enters the swirler 200. The vanes 208 can be inclined both radially and axially relative to the swirler axis 11 to impart a rotational component of motion to the incoming air 190 that enters the swirler 200. These inclined swirler vanes 208 cause the air 190 to swirl in a generally helical manner within the fuel nozzle tip assembly 68. In one aspect of the present invention, the vane 208 has a fillet 226 that extends between the root portion 210 and the hub 205. In addition to facilitating reduction of stress concentrations in the root portion 210, the fillet 226 also facilitates a smooth flow of air in the swirler hub region. The fillet 226 has a smooth contour shape 227 that is designed to promote the smooth flow of air in the swirler. The contour shapes and orientations for a particular vane 208 are designed using known methods of fluid flow analysis. In the exemplary embodiments shown in FIGS. 3-11 herein, the vanes 208 have a cantilever-type of support, wherein it is structurally supported at its root portion 210 on the hub 205 with the vane tip portion 220 essentially free. It is also possible, in some alternative swirler designs, to provide additional structural support to at least some of the vanes 208 at their tip regions 210, such as for example, shown in FIG. 12 that illustrates an alternative embodiment of the present invention. In another aspect of the invention, a recess 222 is provided on the tip portion 220 of a vane 228, such as, for example, shown in FIGS. 4 and 5. The recess 222 engages with adjacent components in a fuel nozzle 100 to orient them axially, such as for example, shown in FIGS. 3, 11 and 12. In the exemplary embodiment shown in FIGS. 4 and 5, the recess 222 comprises a step having a step-change in the radius in the vane tip portion 222. It will be evident to those skilled in the art that it is possible to have other locations on the vane 208 or other geometric configurations for the recess 222.

The exemplary swirler 200 shown in FIGS. 3-5 comprises an adaptor 250 that is located axially aft from the circumferential row of vanes 208. The adaptor 250 comprises an arcuate wall 256 (see FIG. 6) that forms a flow passage 254 for channeling an air flow 190, such as for example, the CDP air flow coming out from a compressor discharge in a turbo fan engine 10 (see FIG. 1). The in-coming air 190 enters the passage 254 in the adaptor 250 and flows axially forward towards the row of vanes 208 of the swirler 200. In one aspect of the present invention, a portion 203 of the swirler body 201 extends axially aft from the hub 205 and forms a portion of the adaptor 250. In the exemplary embodiment shown in FIG. 6, the portion 203 of the body 201 extending axially aft forms a portion of the arcuate wall 256 of the adaptor 250. The adaptor 250 also serves as a means for mounting the swirler 200 in an assembly, such as a fuel nozzle assembly 68, as shown in FIG. 3. In the exemplary embodiment shown in FIG. 6, the adaptor 250 comprises an arcuate groove 252 for receiving a brazing material (not shown) that is used for attaching the adaptor 250 to another structure, such as, for example, a fuel nozzle stem 103 shown in FIG. 2. As can be seen clearly in FIG. 6, the groove 252 in the arcuate wall 256 has a complex three-dimensional geometry that is difficult to form using conventional machining methods. In one aspect of the present invention, the groove 252 in the arcuate wall 256 having a complex three-dimensional geometry, such as shown in the FIGS. 4-10, is formed integrally to have a unitary construction, using the methods of manufacturing described subsequently herein.

Figure 11:
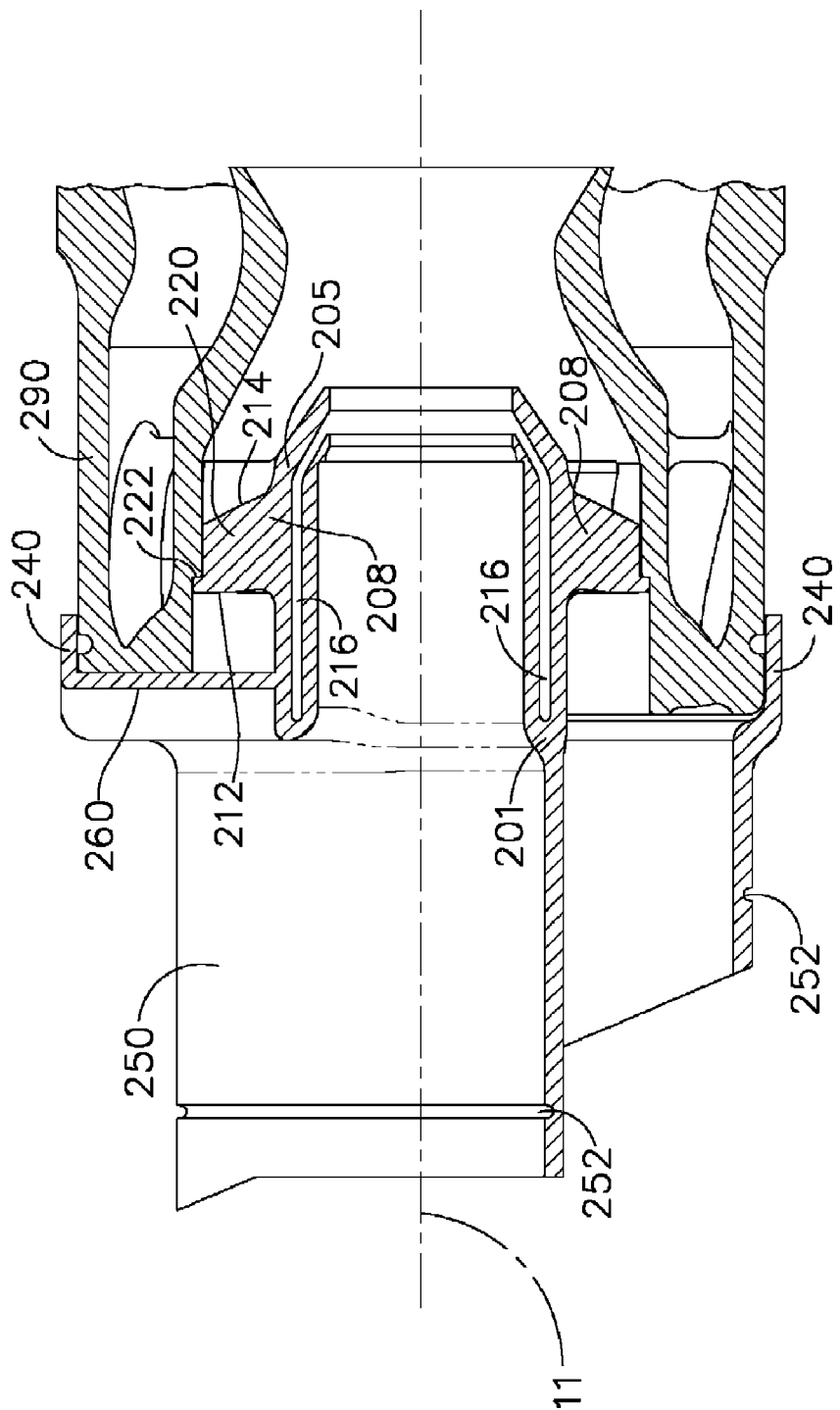
FIG. 11 is an axial cross sectional view of another alternative exemplary embodiment of the present invention of a swirler shown interfacing with an adjacent component.
Figure 12:
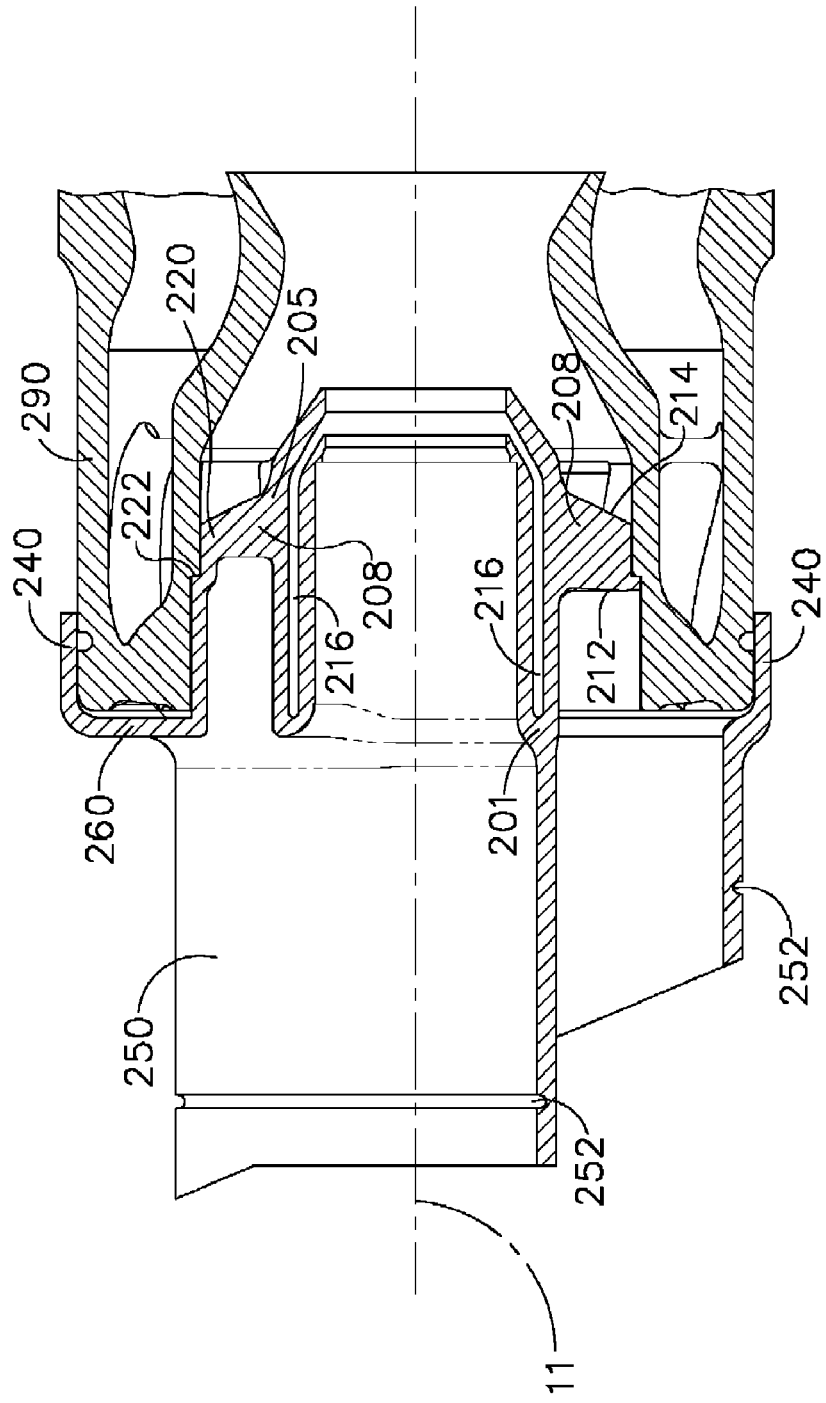
FIG. 12 is an axial cross sectional view of another alternative exemplary embodiment of the present invention of a swirler shown interfacing with an adjacent component.

The exemplary swirler 200 shown in FIGS. 3-5 comprises an annular rim 240 that is coaxial with the swirler axis 11 and is located radially outward from the hub 205. As seen in FIGS. 3, 11 and 12, the rim 240 engages with adjacent components in the fuel nozzle 100, and forms a portion of the flow passage for flowing air 190 in the swirler 200. Airflow 190 enters the aft portion of the swirler 200 in an axially forward direction and is channeled toward the vanes 208 by the hub 205 and rim 240. In the exemplary embodiment shown in FIGS. 4-6, airflow 190, such as from a compressor discharge, enters the passage 254 in the adaptor 250. As seen best in FIGS. 5 and 6, the axially forward end of the arcuate wall 256 of the adaptor 250 is integrally attached to the rim 240 and the body 201. In a preferred embodiment, the adaptor 250, rim 240, the body 201, the hub 205 and the vanes 208 have a unitary construction using the methods of manufacture described herein. Alternatively, the adaptor 250 may be manufactured separately and attached to the rim 240 and body 201 using conventional attachment means.

Referring to FIG. 4, a wall 260 extends between a portion of the rim 240 and a portion of the hub 205 the body 201. The wall 260 provides at least a portion of the structural support between the rim 240 and the hub 205 of the swirler. The wall 260 also ensures that air 190 coming from the adaptor 250 passage 254 into the forward portion of the swirler does not flow in the axially reverse direction and keeps the flow 190 going axially forward toward the vanes 208. In the exemplary embodiment shown in FIG. 5, the forward face 262 of the wall 260 is substantially flat with respect to a plane perpendicular to the swirler axis 11. In order to promote a smooth flow of the air, the edges of the wall 260 (see FIGS. 4 and 5) are shaped smoothly to avoid abrupt flow separation at sharp edges.

It is common in combustor and fuel nozzle applications that the compressor discharge air 190 (see FIGS. 3 and 4) coming into the combustor and fuel nozzle regions is very hot, having temperatures above 800 Deg. F. Such high temperature may cause coking or other thermally induced distress for some of the internal components of fuel nozzles 100 such as, for example, the fuel flow passages 102, 104, and swirler 200. The high temperatures of the air 190 may also weaken the internal braze joints, such as, for example, between the fuel injector 163 and the distributor ring body 171 (see FIG. 3). In one aspect of the present invention, insulation gaps 216 are provided within the body 201 of the swirler 200 to reduce the transfer of heat from the air flowing in the swirler 100 and other internal components, such as primary fuel injectors 163 or secondary fuel injectors 167. The insulation gaps, such as items 216, help to reduce the temperature at the braze joints in a fuel nozzle during engine operations. The insulation gap 216 may be annular, as shown in FIGS. 3, 11 and 12. Other suitable configurations based on known heat transfer analysis may also be used. In the exemplary embodiment shown in FIG. 3, the insulation gap is annular extending at least partially within the swirler body 201, and has a gap radial width of between about 0.015 inches and 0.025 inches. In one aspect of the present invention, the insulation gap 216 may be formed integrally with the swirler body 201 to have a unitary construction, using the methods of manufacturing described subsequently herein. The integrally formed braze groves, such as those described herein, may have complex contours and enable pre-formed braze rings (not shown) to be installed to promote easy assembly.

Referring to FIGS. 4 and 6, it is apparent to those skilled in the art that the airflow 190 entering from the adaptor passage 254 is not uniform in the circumferential direction when it enters the vanes 208. This non-uniformity is further enhanced by the presence of the wall 260. In conventional swirlers, such non-uniformity of the flow may cause non-uniformities in the mixing of fuel and air and lead to non-uniform combustion temperatures. In one aspect of the present invention of a swirler 200, the adverse effects of circumferentially non-uniform flow entry can be minimized by having swirler vanes 208 with geometries that are different from those of circumferentially adjacent vanes. Customized swirler vane 208 geometries can be selected for each circumferential location on the hub 205 based on known fluid flow analytical techniques. A swirler having different geometries for the vanes 208 located at different circumferential locations can have a unitary construction and made using the methods of manufacture described herein.

Figure 7:
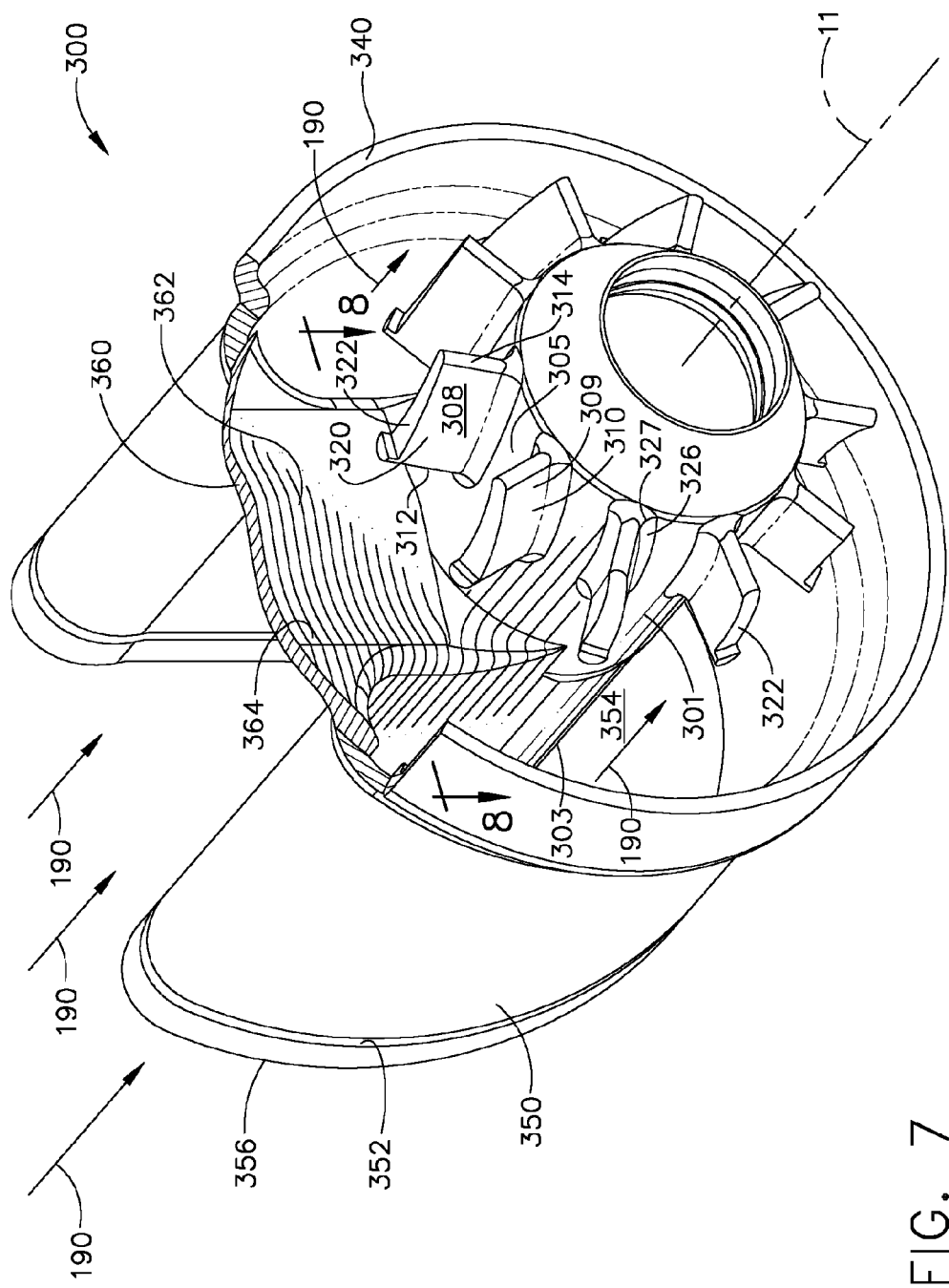
FIG. 7 is an isometric view of a swirler according to an alternative exemplary embodiment of the present invention with a portion of the swirler sectioned away.
Figure 8:
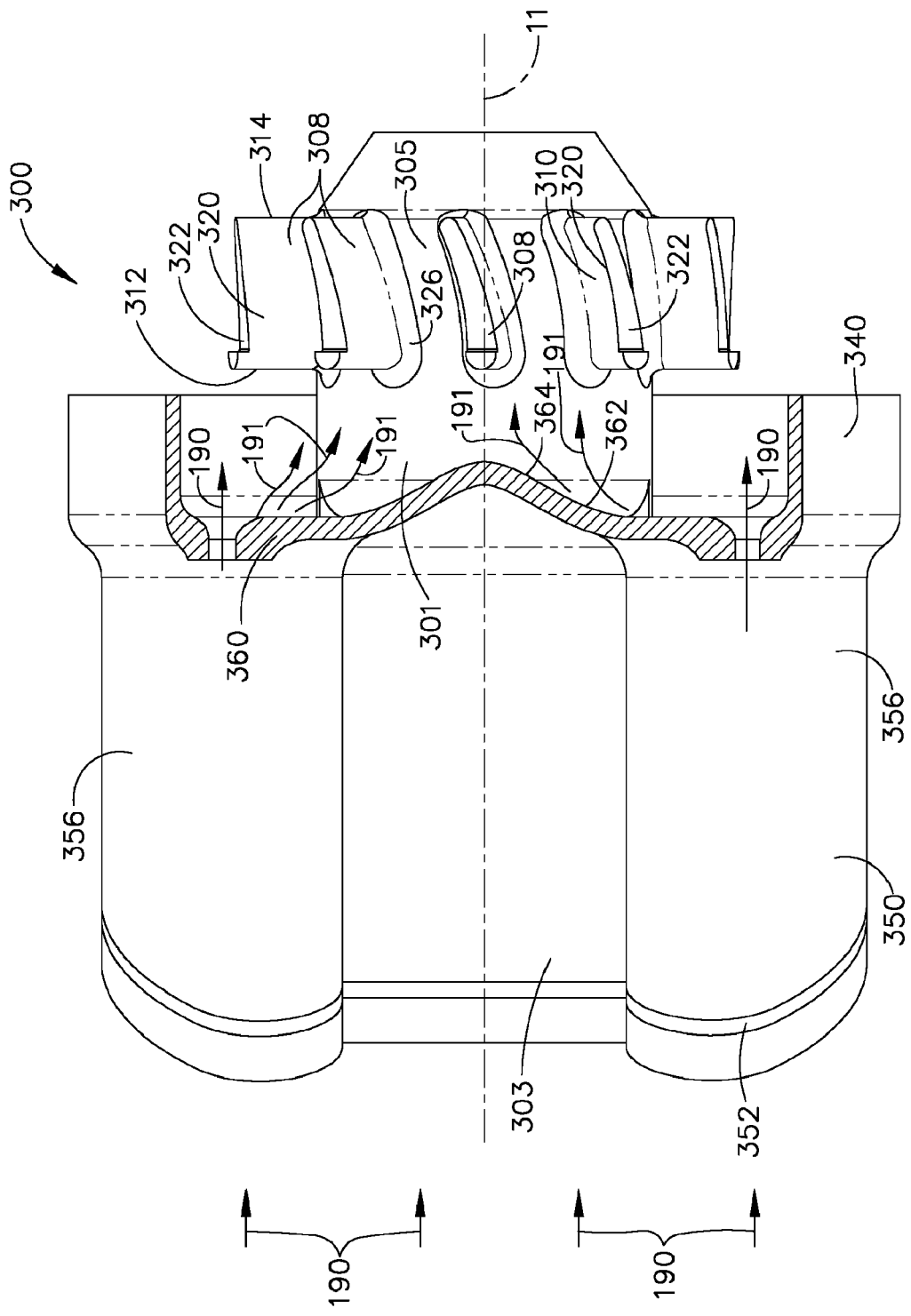
FIG. 8 is a top plan view of the alternative exemplary swirler shown in FIG. 7 with a portion sectioned away.

An alternative exemplary embodiment of a swirler 300 is shown in FIGS. 7 and 8. The alternative exemplary embodiment of the swirler 300 comprises swirler vanes 308, body 301, hub 305, adaptor 350 and rim 340 similar to the swirler 200 described previously herein. FIG. 7 is an isometric view of the alternative exemplary embodiment of the swirler 300 with a portion of the swirler rim 340 and wall 360 sectioned away. FIG. 8 is a top plan view of the alternative exemplary swirler 300 shown in FIG. 7. As described previously, the presence of a wall such as wall 260 (see FIG. 5) may introduce non-uniformity of flow of air entering the vanes 208, especially those vanes 208 located axially in front of the wall 260. One way to mitigate the non-uniformity of flow near the wall is by reducing the detachment of flow 190 near the wall 200. This is accomplished in the alternative exemplary embodiment of the swirler 300 by having a wall 360 with a contour shape for its forward face 362, as shown in FIG. 8. The aerodynamic contour shape for the wall 360 can be selected to reduce flow separation near the wall 360 based on known fluid flow analytical techniques. The improved flow direction near the wall 360, represented by flow arrows 191 (see FIG. 8), provides a more uniform air flow into the vanes 308, especially to those vanes 308 located axially in front of the wall 360. The adverse effects of circumferentially non-uniform flow entry can be further minimized by having smooth edges for the wall 360 and/or by having swirler vanes 309 with geometries that are different from those of circumferentially adjacent vanes 308, as discussed before. The alternative exemplary embodiment of the swirler 300 having complex geometries for the wall 360 and vanes 308, 309 can be made using the methods of manufacture described herein.

Figure 9:
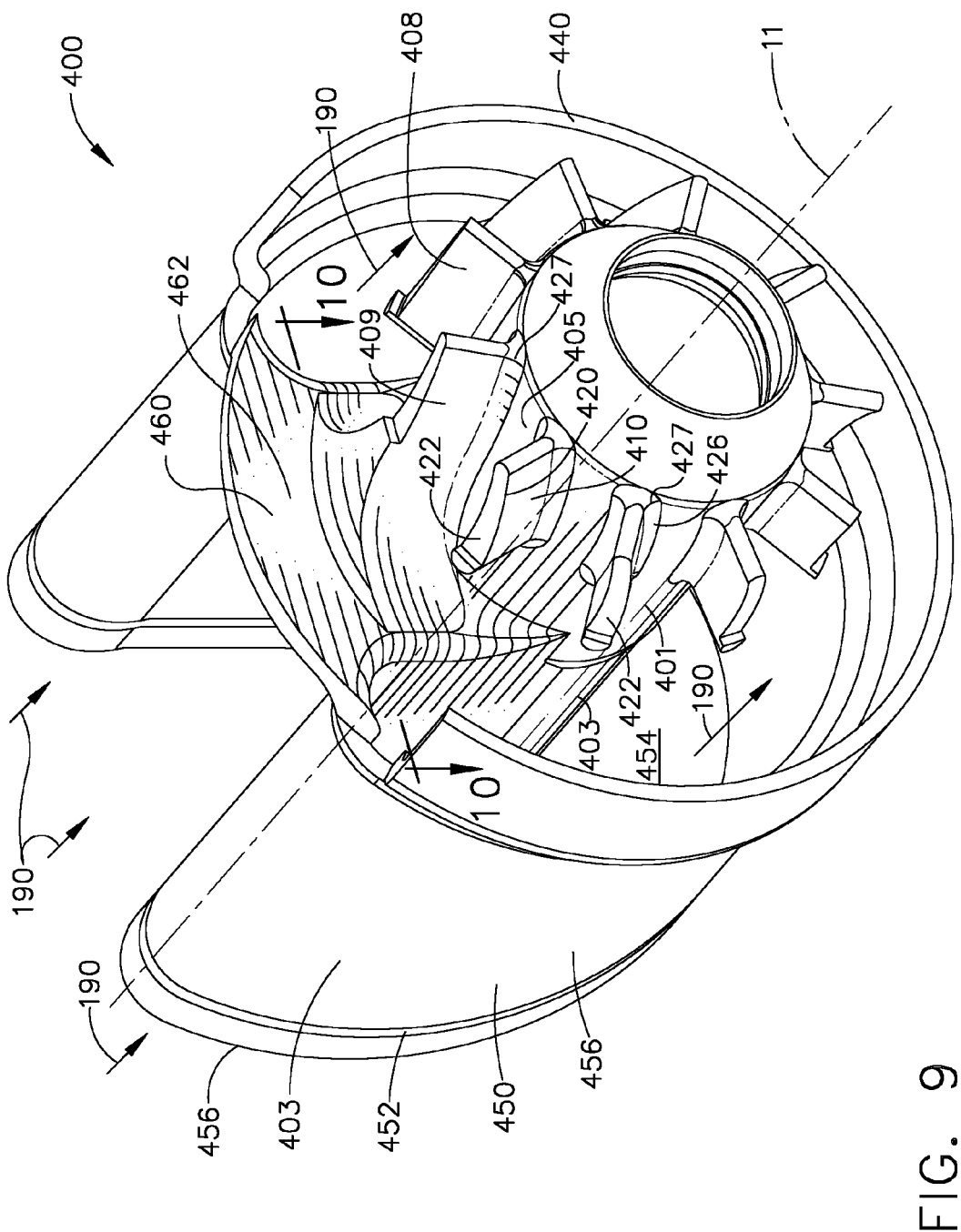
FIG. 9 is an isometric view of a swirler according to another alternative exemplary embodiment of the present invention with a portion of the swirler sectioned away.
Figure 10:
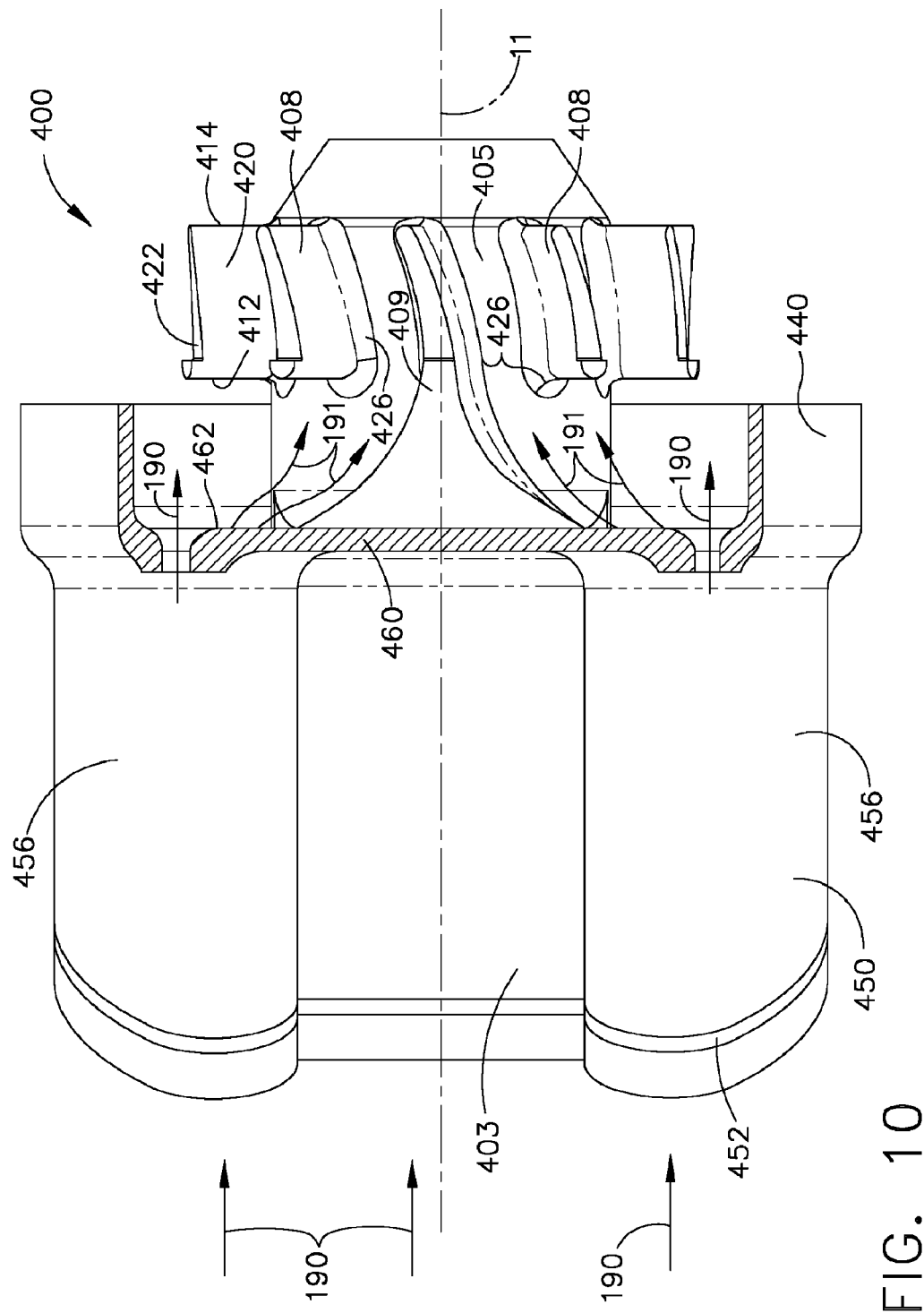
FIG. 10 is a top plan view of the alternative exemplary swirler shown in FIG. 9 with a portion sectioned away.

Another alternative exemplary embodiment of a swirler 400 is shown in FIGS. 9 and 10. The alternative exemplary embodiment of the swirler 400 comprises swirler vanes 408, body 401, hub 405, adaptor 450 and rim 440 similar to the swirlers 200, 300 described previously herein. FIG. 9 is an isometric view of the alternative exemplary embodiment of the swirler 400 with a portion of the swirler rim 440 and wall 460 sectioned away. FIG. 10 is a top plan view of the alternative exemplary swirler 400 shown in FIG. 9. As described previously, the presence of a wall such as wall 260 (see FIG. 5) may introduce non-uniformity of flow of air entering the vanes 208, especially those vanes 208 located axially in front of the wall 260. The non-uniformity of flow near the wall can be reduced by reducing the detachment of flow 190 near the wall 200. This is accomplished in the alternative exemplary embodiment of the swirler 400 by having a vane 409 that extends axially forward from the forward face 462 of the wall 460, as shown in FIGS. 9 and 10. The aerodynamic contour shapes for the wall 460 and the vane 409 may be designed to reduce flow separation near the wall 360 based on known fluid flow analytical techniques. The improved flow direction near the wall 460, represented by flow arrows 191 (see FIG. 10), provides a more uniform air flow into the vanes 408, 409 especially to those vanes located axially in front of the wall 460. The adverse effects of circumferentially non-uniform flow entry can be further minimized by having smooth edges for the wall 460 and/or by having more swirler vanes 409 with geometries that are different from those of circumferentially adjacent vanes 408, as discussed before. The alternative exemplary embodiment of the swirler 400 having complex geometries for the wall 460 and vanes 408, 409 can be made using the methods of manufacture described herein.

FIGS. 11 and 12 show alternative exemplary embodiments for the location of the wall 260. In the exemplary embodiment shown in FIG. 3, the wall 260 is located at an axially aft end of the hub 205 of the body 201. In some applications, it may be advantageous, such as for example, in order to reduce mechanical vibrations, to locate the wall 260 axially forward. FIG. 11 shows an exemplary embodiment wherein the wall 260 is located axially forward from an aft end of the hub 205, at a location that is axially aft from the leading edge 212 of the vanes 208. Alternatively, FIG. 12 shows another exemplary embodiment wherein the wall 260 extends from the tip portion 220 of a vane 208. In some designs, it is also possible for the wall 260 to extend from the tip portion 220 of a plurality of vanes 208.

The exemplary embodiments of the unitary swirler 200 shown in FIGS. 3-6, and the alternative embodiments of the unitary swirlers 300, 400 shown in FIGS. 7-12, can be made using rapid manufacturing processes such as Direct Metal Laser Sintering (DMLS), Laser Net Shape Manufacturing (LNSM), electron beam sintering and other known processes in the manufacturing. DMLS is a preferred method of manufacturing unitary swirlers 200, 300, 400 described herein.

Figure 13:
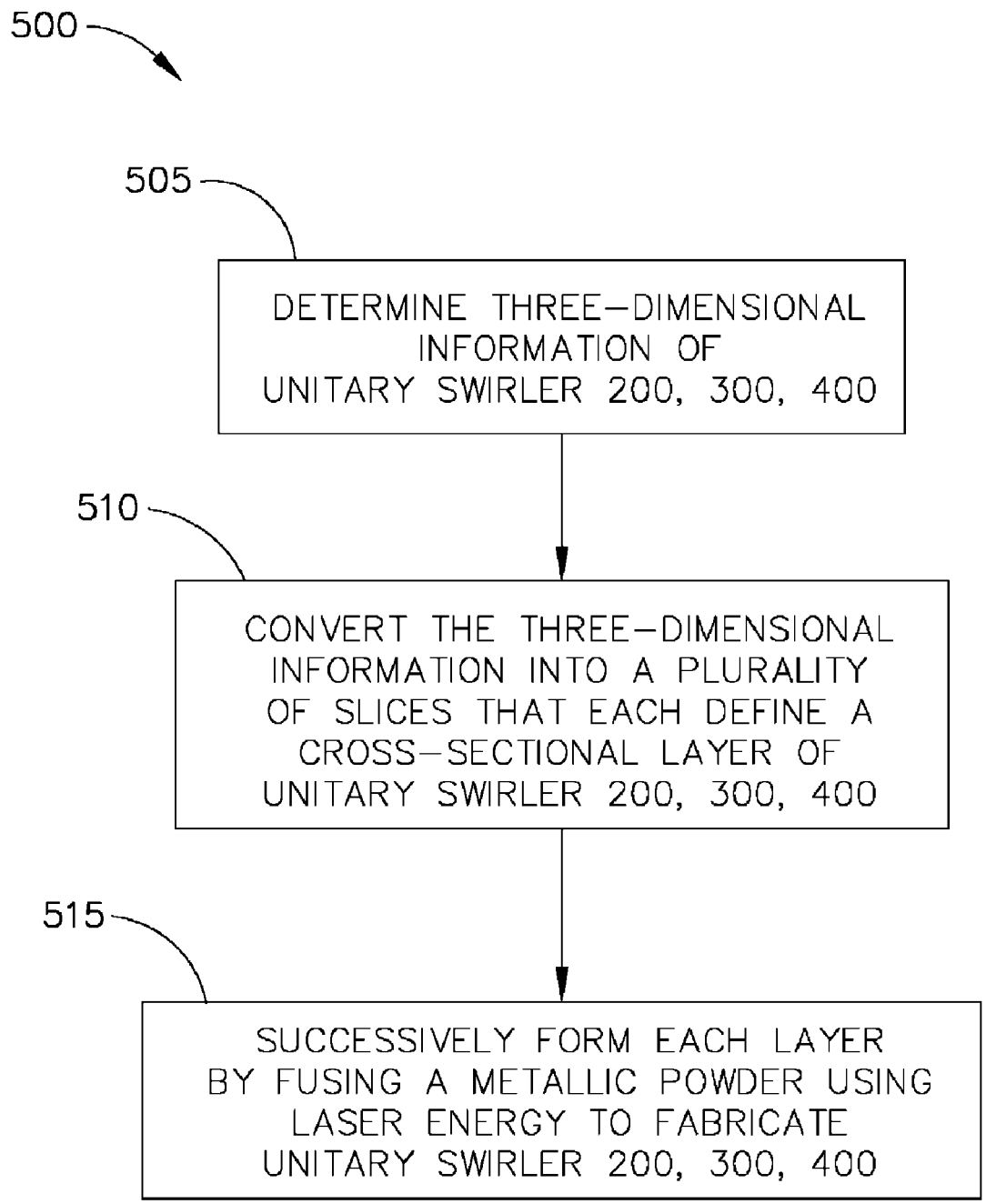
FIG. 13 is a flow chart showing an exemplary embodiment of a method for fabricating a unitary swirler.

FIG. 13 is a flow chart illustrating an exemplary embodiment of a method 500 for fabricating unitary swirlers, such as items 200, 300 and 400 described herein, and shown in FIGS. 3-12. Although the method of fabrication 500 is described below using unitary swirler 200 as an example, the same methods, steps, procedures, etc. apply for the alternative exemplary embodiments of the swirlers shown in FIGS. 9-12. Method 500 includes fabricating unitary swirler 200 (shown in FIGS. 3-6) using Direct Metal Laser Sintering (DMLS). DMLS is a known manufacturing process that fabricates metal components using three-dimensional information, for example a three-dimensional computer model, of the component. The three-dimensional information is converted into a plurality of slices, each slice defining a cross section of the component for a predetermined height of the slice. The component is then "built-up" slice by slice, or layer by layer, until finished. Each layer of the component is formed by fusing a metallic powder using a laser.

Accordingly, method 500 includes the step 505 of determining three-dimensional information of a unitary swirler 200 and the step 510 of converting the three-dimensional information into a plurality of slices that each define a cross-sectional layer of the unitary swirler 200. The unitary swirler 200 is then fabricated using DMLS, or more specifically each layer is successively formed in step 515 by fusing a metallic powder using laser energy. Each layer has a size between about 0.0005 inches and about 0.001 inches. Unitary swirler 200 may be fabricated using any suitable laser sintering machine. Examples of suitable laser sintering machines include, but are not limited to, an EOSINT.RTM. M 270 DMLS machine, a PHENIX PM250 machine, and/or an EOSINT.RTM. M 250 Xtended DMLS machine, available from EOS of North America, Inc. of Novi, Mich. The metallic powder used to fabricate unitary swirler 200 is preferably a powder including cobalt chromium, but may be any other suitable metallic powder, such as, but not limited to, HS188 and INCO625. The metallic powder can have a particle size of between about 10 microns and 74 microns, preferably between about 15 microns and about 30 microns.

Although the methods of manufacturing unitary swirler 200 have been described herein using DMLS as the preferred method, those skilled in the art of manufacturing will recognize that any other suitable rapid manufacturing methods using layer-by-layer construction or additive fabrication can also be used. These alternative rapid manufacturing methods include, but not limited to, Selective Laser Sintering (SLS), 3D printing, such as by inkjets and laserjets, Sterolithography (SLS), Direct Selective Laser Sintering (DSLS), Electron Beam Sintering (EBS), Electron Beam Melting (EBM), Laser Engineered Net Shaping (LENS), Laser Net Shape Manufacturing (LNSM) and Direct Metal Deposition (DMD).

The unitary swirler 200 for a fuel nozzle 100 in a turbine engine (see FIGS. 1-3) comprises fewer components and joints than known swirlers and fuel nozzles. Specifically, the above described unitary swirler 200 requires fewer components because of the use of a one-piece unitary swirler 200 comprising a plurality of vanes 208, body 201, rim 40, wall 260. As a result, the described fuel unitary swirler 200 provides a lighter, less costly alternative to known fuel swirlers. Moreover, the described unitary construction for the unitary swirler 200 provides fewer opportunities for leakage or failure and is more easily repairable compared to known swirlers.

As used herein, an element or step recited in the singular and proceeded with the word "a" or "an" should be understood as not excluding plural said elements or steps, unless such exclusion is explicitly recited. When introducing elements/components/steps etc. of unitary swirlers 200, 300, 400 described and/or illustrated herein, the articles "a", "an", "the" and "said" are intended to mean that there are one or more of the element(s)/component(s)/etc. The terms "comprising", "including" and "having" are intended to be inclusive and mean that there may be additional element(s)/component(s)/etc. other than the listed element(s)/component(s)/ etc. Furthermore, references to "one embodiment" of the present invention are not intended to be interpreted as excluding the existence of additional embodiments that also incorporate the recited features.

Although the methods and articles such as unitary swirlers 200, 300, 400 described herein are described in the context of swirling of air for mixing liquid fuel with air in a turbine engine, it is understood that the unitary swirlers 200, 300, 400 and methods of their manufacture described herein are not limited to fuel nozzles or turbine engines. The unitary swirlers 200, 300, 400 illustrated in the figures included herein are not limited to the specific embodiments described herein, but rather, these can be utilized independently and separately from other components described herein.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A swirler comprising:
a single monolithic element, the single monolithic element comprising
a body having swirler axis and compising a hub,
a plurality of vanes arranged in a circumferential direction around the axis and extending from the hub, each of the plurality of vanes comprising a root portion located on the hub, and
an adaptor extending axially from the body, the adaptor comprising a wall forming a flow passage for channeling air flow to the vanes, the flow passage being generally U-shaped at an upstream end and generally circular at a downstream end, the downstream end comprising an annular rim disposed coaxially with the swirler axis and radially outward from the hub;
wherein the single monolithic element is made using a rapid manufacturing process.

2. A swirler according to claim 1 wherein each vane has a leading edge and a trading edge located axially forward from the leading edge, and has an orientation that facilitates producing a swirling motion to an airflow flowing through the swirler.

3. A swirler according to claim 1 wherein each vane has substantially the some geometry.

4. A swirler according to claim 1 wherein at least one vane has a geometry that is different from another vane.

5. A swirler according to claim 1 further comprising a fillet between the root portion of a vane and the swirler hub.

6. A swirler according to claim 5 wherein the fillet has a contour that facilitates a smooth flow of air near the root portion.

7. A swirler according to claim 1 wherein at least some of the vanes have a tip portion that is free.

8. A swirler according to claim 7 wherein at least one vane has a recess extending through at least a portion of the tip portion.

9. A swirler according to claim 1 wherein the body has on insulation gap located at least partially within the body.

10. A swirler according to claim 1 wherein the adaptor has a groove capable of receiving a brazing material.

11. The swirler of claim 1, wherein the rapid manufacturing process comprises a laser sintering process.

12. The swirler of claim 1, wherein the rapid manufacturing process comprises Direct Metal Laser Sintering (DMLS).

13. A swirler comprising:
a body comprising a swirler hub having a swirler axis;
a plurality of vanes extending from the hub, the vanes being arranged in a circumferential direction around the swirler axis; and
an adaptor disposed coaxially with the body about the swirler axis, the adaptor comprising
an arcuate wall defining an axially oriented passage that is configured to direct a flow of air towards at least some of the plurality of vanes,
a rim located coaxially with the swirler axis and radially outward from the hub, and
a connecting extending between a portion of the rim and a portion of the hub, at least one face of the connecting wall being substantially perpendicular to the swirler axis;
wherein the body, the swirler hub, the plurality of vanes, the arcuate wall, the rim, and the connecting wall are monolithically formed as a single piece.

14. A swirler according to claim 13 wherein the adaptor has a groove capable of receiving a brazing material.

15. A swirler according to claim 13 wherein the body has an insulation gap located at least partially within the body.

16. A swirler according to claim 13 wherein each vane has substantially the same geometry.

17. A swirler according to claim 13 wherein at least one vane has a geometry that is different from another vane.

18. A swirler according to claim 13 wherein the at least one face of the connecting wall is substantially flat.

19. A swirler according to claim 13 wherein the wall has an axially forward face having a contour that facilitates a smooth flow of air.

20. A swirler according to claim 13 wherein at least one vane extends from an axially forward face of the wall.

21. A swirler according to claim 13 wherein at least one vane has a tip portion that is free.

22. A swirler according to claim 21 wherein at least one vane has a recess extending through a portion of the tip portion.

23. A swirler according to claim 13 wherein the wall is located at an axially aft end of the hub.

24. A swirler according to claim 13 wherein the wall is located axially forward from an aft end of the hub.

25. A swirler according to claim 13 wherein the wall extends from the tip portion of a vane.

26. The swirler of claim 13, wherein swirler is made using a rapid manufacturing process.

27. The swirler of claim 26, wherein the rapid manufacturing process comprises a laser sintering process.

28. The swirler of claim 26, wherein the rapid manufacturing process Comprises Direct Metal Laser Sintering (DMLS).

* * * * *